US009529106B2

(12) United States Patent
Mandroux et al.

(10) Patent No.: US 9,529,106 B2
(45) Date of Patent: Dec. 27, 2016

(54) METHOD AND DEVICE FOR MARINE SEISMIC ACQUISITION

(71) Applicant: CGG SERVICES SA, Massy (FR)

(72) Inventors: Fabrice Mandroux, Montrouge (FR); Alexandre Lenart, Paris (FR)

(73) Assignee: CGG SERVICES SA, Massy (FR)

( * ) Notice: Subject to any disclaimer, the term of this patent is extended or adjusted under 35 U.S.C. 154(b) by 0 days.

(21) Appl. No.: 15/043,661

(22) Filed: Feb. 15, 2016

(65) Prior Publication Data

US 2016/0245944 A1 Aug. 25, 2016

Related U.S. Application Data

(63) Continuation of application No. 13/443,127, filed on Apr. 10, 2012, now Pat. No. 9,261,619.

(60) Provisional application No. 61/582,633, filed on Jan. 3, 2012, provisional application No. 61/587,285, filed on Jan. 17, 2012.

(51) Int. Cl.
G01V 1/38 (2006.01)
(52) U.S. Cl.
CPC .................... G01V 1/3808 (2013.01)
(58) Field of Classification Search
CPC .................................................. G01V 1/3808
USPC ............................................... 367/16, 19, 20
See application file for complete search history.

(56) References Cited

U.S. PATENT DOCUMENTS

| 6,285,956 B1 | 9/2001 | Bennett et al. |
| 6,484,100 B1 | 11/2002 | Zuurbier et al. |
| 7,400,552 B2 | 7/2008 | Moldoveanu et al. |
| 7,948,825 B2 * | 5/2011 | Moldoveanu ........ G01V 1/3861 181/118 |
| 8,205,711 B2 | 6/2012 | Hopperstad et al. |
| 2003/0067842 A1 | 4/2003 | Sukup et al. |

(Continued)

FOREIGN PATENT DOCUMENTS

| WO | 02/25315 A2 | 3/2002 |
| WO | 2009/092069 A1 | 7/2009 |

(Continued)

OTHER PUBLICATIONS

Robert Dowle et al., "Uses of Wide-Azimuth and Variable-Depth Streamers for Sub-Basalt Seismic Imaging", First Break, Special Topic, Marine Seismic, vol. 29, Dec. 2011.

(Continued)

*Primary Examiner* — Daniel L Murphy
(74) *Attorney, Agent, or Firm* — Patent Portfolio Builders PLLC

(57) ABSTRACT

Methods and systems for improving azimuth distribution in a seismic acquisition system are described. A survey acquisition system includes a plurality of streamers towed by a plurality of streamer vessels, including a first streamer vessel and a second streamer vessel and a plurality of sources towed by a plurality of source vessels. The plurality of streamer vessels and plurality of source vessels are configured relative to one another such that the plurality of source vessels are positioned at one or more predetermined inline distances behind a portion of the first streamer vessel and are also positioned at one or more predetermined inline distances in front of a portion of the second streamer vessel. The plurality of streamer vessels and plurality of source vessels are also spaced apart from one another in a cross-line direction.

20 Claims, 14 Drawing Sheets

(56) References Cited

U.S. PATENT DOCUMENTS

| | | |
|---|---|---|
| 2007/0159921 A1 | 7/2007 | Regone et al. |
| 2007/0165486 A1 | 7/2007 | Moldoveanu et al. |
| 2008/0285381 A1 | 11/2008 | Moldoveanu et al. |
| 2009/0122640 A1 | 5/2009 | Hill et al. |
| 2010/0027374 A1 | 2/2010 | Moloveanu et al. |
| 2011/0158044 A1 | 6/2011 | Moldoveanu et al. |
| 2011/0199857 A1 | 8/2011 | Garden |
| 2012/0002503 A1 | 1/2012 | Janiszewski et al. |
| 2012/0033525 A1 | 2/2012 | Abma et al. |
| 2012/0092956 A1 | 4/2012 | Soubaras |
| 2012/0320711 A1 | 12/2012 | Hite |

FOREIGN PATENT DOCUMENTS

| | | |
|---|---|---|
| WO | 2011/057324 A1 | 5/2011 |
| WO | 2011/082308 A2 | 7/2011 |

OTHER PUBLICATIONS

Buia, et al.; "Shooting Seismic Surveys in Circles"; Oilfield Review, Autumn 2008; pp. 1-31; Schlumberger; Houston, TX, USA.

N. Moldoveanu et al., "What is the next step after WAZ for exploration in the Gulf of Mexico?", SEG International Exposition and Annual Meeting, Houston, Texas, Oct. 23-29, 2009, pp. 41-45.

J. Naranjo et al., "Survey Design and Implementation of a Multiple Wide-Azimuth Towed Streamer Seismic Acquisition Strategy at the Tiber Discovery; Deep Water Gulf of Mexico, USA", SEG Annual Meeting, San Antonio, Texas, Sep. 18-23, 2011, pp. 132-136.

E. Fromyr, et al.; "Offset and Azimuth Diversity A Recipe for Complex Imaging"; Finding Petroleum; The Geological Society; PGS; Jan. 25, 2011; pp. 1-42. (See attached Appendix A for relevancy statement.).

* cited by examiner

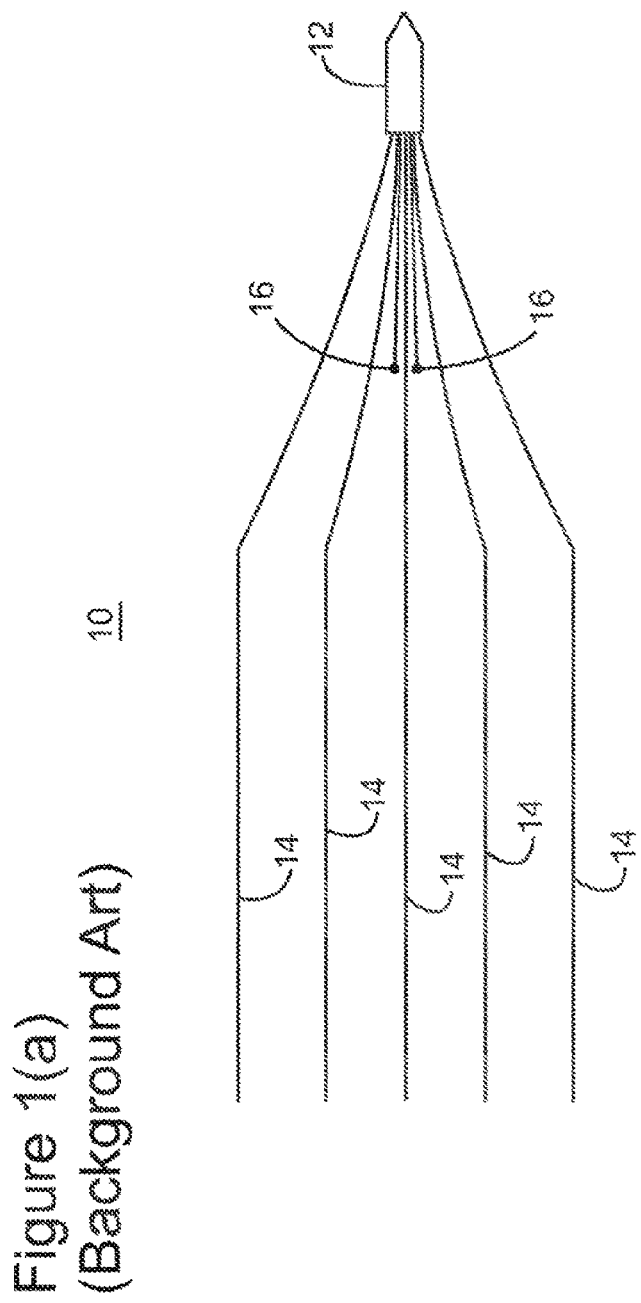

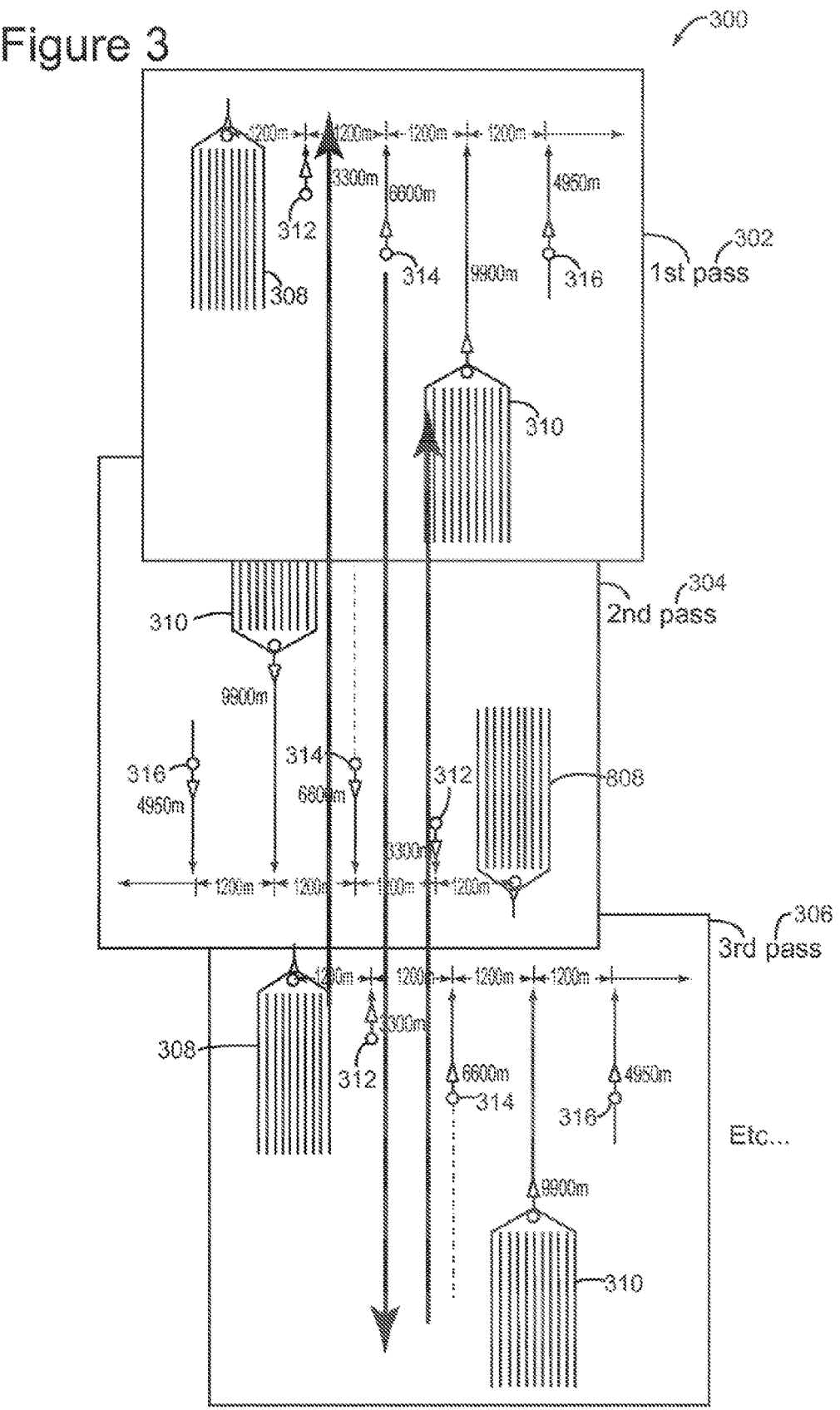

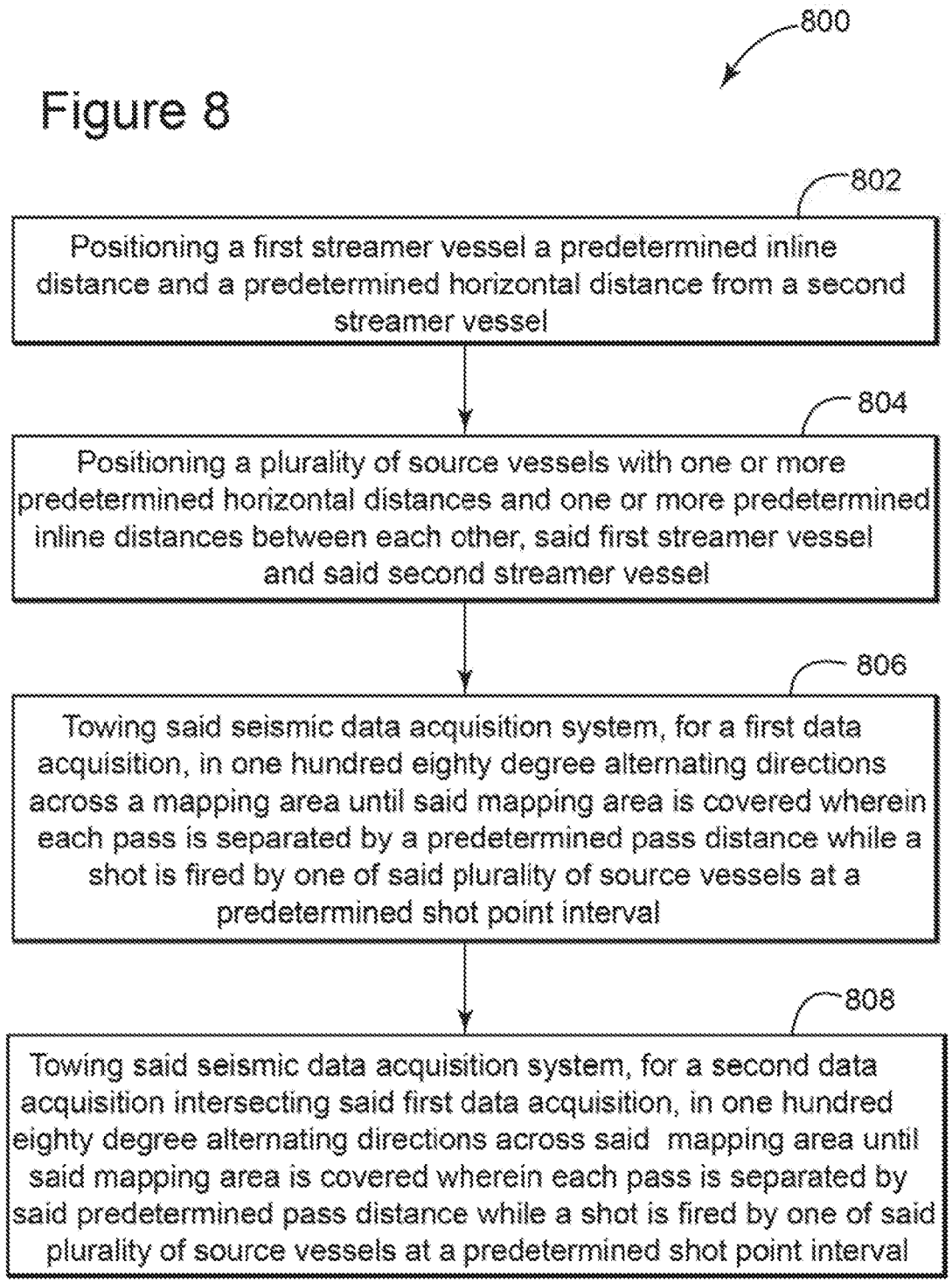

METHOD AND DEVICE FOR MARINE SEISMIC ACQUISITION

RELATED APPLICATION

This application is a continuation of, and claims priority from, U.S. patent application Ser. No. 13/443,127, filed on Apr. 10, 2012 which claims priority from U.S. Provisional Patent Application No. 61/582,633, filed Jan. 3, 2012, entitled "STAGSEIS," to Fabrice Mandroux, the disclosure of which is incorporated herein by reference and U.S. Provisional Patent Application No. 61/587,285, filed Jan. 17, 2012, entitled "STAGSEIS," to Fabrice Mandroux, the disclosure of which is incorporated herein by reference.

TECHNICAL FIELD

Embodiments of the subject matter disclosed herein generally relate to methods and systems for marine seismic data acquisition and, more particularly, to mechanisms and techniques for improved azimuth and offset distribution in marine seismic data acquisition.

BACKGROUND

Marine seismic data acquisition and processing techniques are used to generate a profile (image) of a geophysical structure (subsurface) under the seafloor. This profile does not necessarily provide an accurate location for oil and gas reservoirs, but it may suggest, to those trained in the field, the presence or absence of oil and/or gas reservoirs. Thus, providing better image of the subsurface is an ongoing process.

For a seismic gathering process, as shown in FIG. 1(a), a data acquisition system 10 includes a vessel 12 towing plural streamers 14 that may extend over kilometers behind the vessel. One or more source arrays 16 may be also towed by the vessel 10 or another vessel for generating seismic waves. Conventionally, the source arrays 16 are placed in front of the streamers 14, considering a traveling direction of the vessel 10. The seismic waves generated by the source arrays propagate downward and penetrate the seafloor, eventually being reflected by a reflecting structure (not shown) back to the surface. The reflected seismic waves propagate upwardly and are detected by detectors provided on the streamers 14. This process is generally referred to as "shooting" a particular seafloor area, which area is referred to as a "cell". However, such a method results in data having poor azimuth distribution.

An improvement to this conventional data acquisition method is the use of wide-azimuth (WAZ) acquisition. In a typical WAZ survey, two streamer vessels and multiple sources are used to cover a large sea area, and all sources and streamers are controlled at a uniform depth throughout the survey. WAZ acquisition provides better illumination of the substructure and, thus, a better final image.

A newer approach, rich-azimuth (RAZ) acquisition, shows promising signs for improving the final image. RAZ acquisition is the combination of multi-azimuth acquisition and wide-azimuth geometry. RAZ acquisition may be implemented by shooting a same cell in three directions, e.g., 30°, 90°, and 150°, each direction being shot in one or two passes. A rose diagram (an example of which will be described below with respect to FIG. 1(b)) for such a rich-azimuth survey shows the benefits of rich-azimuth towed-streamer acquisition, A seismic data acquisition system 20, shown in FIG. 1(c) depicts a plurality of streamers 24 attached to a streamer vessel 22 which can be used to perform seismic surveys. The streamer vessel bisects two pairs of source vessels 26, 28 with the first pair of source vessels 26 configured 1200 meters cross-line on each side of the streamer vessel 22 and the second pair of source vessels 28 configured 2400 meters cross-line on each side of the streamer vessel 22. It should be noted that the first pair of source vessels 26 are in-line with the streamer vessel 22 and the second pair of source vessels 28 are 8000 meters in-line in front of the streamer vessel 22.

Looking now to FIG. 1(d), a honeycomb pattern 40 for towing the seismic data acquisition system 20 is depicted. The honeycomb pattern 40 is created by towing the prior art seismic data acquisition system 20 in three intersecting directions 42, 44, 46 across the mapping area 48. For the configuration of the seismic data acquisition system 20, the passes across the mapping area 48 in the same direction are separated by 600 meters. It should be noted that the three towing directions 42, 44, 46 are each rotated one hundred twenty degrees from each other and each towing direction does not use an antiparallel acquisition towing pattern. Further, shots are fired, based on a predetermined shot point interval, as the seismic data acquisition system 20 is towed across the mapping area.

Looking now to FIG. 1(b), a Rose diagram 60 of the data collected by the prior art seismic data acquisition system 20 is depicted. The Rose diagram illustrates a 5000 meter distance 62, a 10,000 meter distance 64 and a 15,000 meter distance 66. Continuing with the Rose diagram 60, three azimuthal bands 68, 70, 72 of charted data are shown representing the three towing directions of the seismic data acquisition system 20. Blank regions indicate areas where no data was collected as a result of the seismic data system 20 configuration, tow patterns 42, 44, 46 and the shot point interval. Consequently, it can be seen from the Rose diagram 60 that none of the concentric rings 62, 64, 66 representing a mapping area have complete coverage with collected seismic data.

However, the existing RAZ acquisition techniques can further be improved to increase the illumination and accuracy of the final image by finding an appropriate number and distribution of source arrays and streamer vessels to achieve ultra-long offset together with broadband techniques. Accordingly, it would be desirable to provide systems and methods that avoid the afore-described problems and drawbacks, and improve the accuracy of the final image.

SUMMARY

According to an exemplary embodiment, a survey acquisition system includes a plurality of streamers towed by a plurality of streamer vessels, including a first streamer vessel and a second streamer vessel and a plurality of sources towed by a plurality of source vessels. The plurality of streamer vessels and plurality of source vessels are configured relative to one another such that the plurality of source vessels are positioned at one or more predetermined inline distances behind a portion of the first streamer vessel and are also positioned at one or more predetermined inline distances in front of a portion of the second streamer vessel. The plurality of streamer vessels and plurality of source vessels are also spaced apart from one another in a cross-line direction.

According to another exemplary embodiment, a method for seismic data acquisition, includes configuring a seismic data acquisition system by: positioning a plurality of source vessels at one or more predetermined inline distances behind a portion of a first streamer vessel, positioning the plurality of source vessels at one or more predetermined inline distances in front of a portion of a second streamer vessel, and spacing the plurality of streamer vessels and the plurality of source vessels apart from one another in a cross-line direction; and acquiring the seismic data using the configured seismic data acquisition system by shooting sources associated with the plurality of source vessels to generate acoustic signals and receiving reflected acoustic signals at streamers associated with the first streamer vessel and the second streamer vessel.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 1(a)-1(d) are various illustrations associated with background art seismic data acquisition systems;

FIG. 3 is a schematic diagram of a novel seismic data acquisition system according to an exemplary embodiment wherein different passes in an in-line direction are depicted;

FIG. 8 is a flowchart illustrating a method for collecting seismic data with an exemplary embodiment of a novel seismic data acquisition system.

DETAILED DESCRIPTION

Figure 1B:
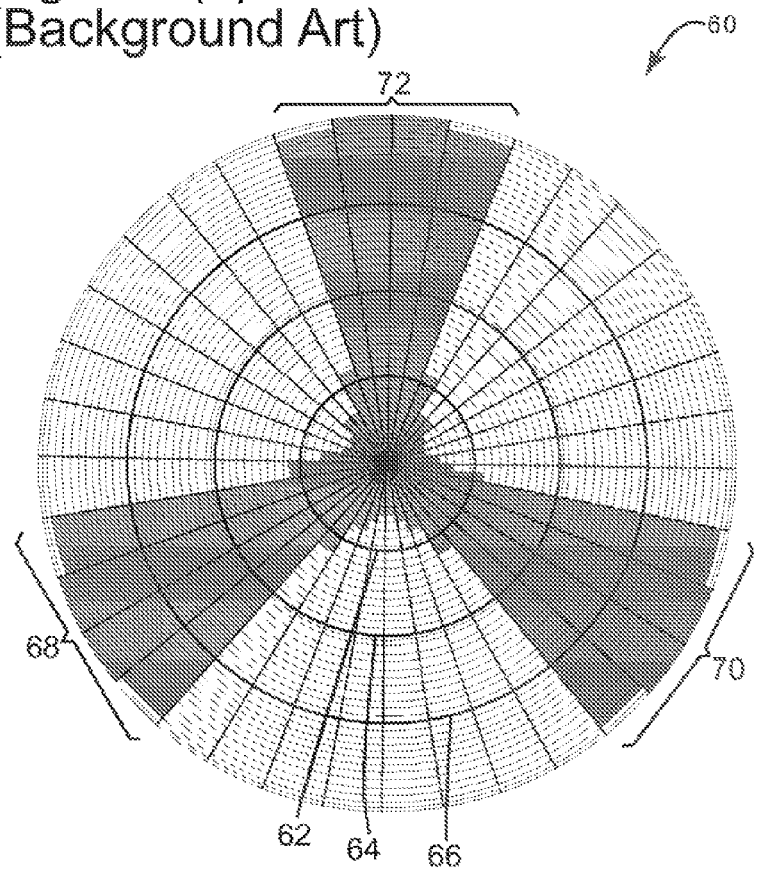

The following description of the exemplary embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to the terminology and structure of RAZ acquisition using one or more streamer vessels and a plurality of sources. However, the embodiments to be discussed next are not limited to these configurations, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

In order to provide a context for the subsequent exemplary embodiments, a description of aspects and terminology is hereby included. It should be noted in an exemplary embodiment that an individual source can be, for example, an air gun. In another aspect of an exemplary embodiment, objects named birds can be located on the one or more lines connected to the one or more streamer vessels for maintaining the streamers in the desired positions. Continuing with an exemplary embodiment, the birds are devices capable of maintaining a cross-line position or a depth position. In another aspect of an exemplary embodiment, a coordinate system for describing the direction of travel of the different vessels can be related to an X-axis, Y-axis system wherein the X-axis is the direction of travel of the vessels or in-line direction and the Y-axis, also known as the cross-line direction, is perpendicular to the X-axis direction.

Continuing with the general context description of an exemplary embodiment, the individual sources can be fired based on various schemes. One scheme in an exemplary embodiment can shoot the sources sequentially. For example, fire the sources at 37.5 meter intervals, i.e., shoot a first front source, wait for the first source to travel 37.5 meters along the X-axis, then shoot the central source and so on. It should be noted in the exemplary embodiment that the value of 37.5 meters is an example and can vary, e.g., based on the speed of the streamer vessel. In this fashion, the sources are fired when, for example, they have the same X-axis, or in-line, position during a firing sequence.

It should further be noted in the exemplary embodiment that a firing sequence includes the sequential one-time firing of each source. In another exemplary embodiment firing sequence, the sources are fired either simultaneously or almost simultaneously with random time delays between firings. It should be noted in the exemplary embodiment that for a twenty kilometer offset the tail sources must be shot until the end of the full-fold boundary. Further, it should be noted in an exemplary embodiment that a large offset between a source and a traveling distance is considered by the industry to be equal to or larger than two thousand meters.

According to an exemplary embodiment, a system configuration for enriching RAZ acquisition includes plural streamer vessels configured to tow plural streamers and plural source vessels configured to tow one or more source arrays. For example, three source vessels may be configured to sail parallel to two streamer vessels. The three source vessels may be positioned between the two streamer vessels in a traveling (inline) direction and, according to an embodiment, also in a cross-line direction.

For example, in the following embodiments two streamer vessels can be arranged in a staggered relationship relative to each other to provide a stretching of the vessel setup or configuration in both the inline and cross-line directions. More specifically, according to some embodiments, a five vessel setup or configuration can be specified by placing vessels at the following relative coordinates:

One streamer vessel is positioned at coordinate (0,0),
One source vessel at approximately coordinate (SW;−SL/3),
One source vessel at approximately coordinate (SW*2;−2*SL/3),
One streamer vessel at approximately coordinate (SW*3;−SL), and
One source vessel at approximately coordinate (SW*4;−SL/2), where The coordinate variables are determined as follows:
NS=number of streamers per vessel, SP=separation between streamers.
SW=NS*SP,
SPI=Shot point interval, and
SL=streamer length adjusted so that SL is a multiple of SPI, 2 and 3. For example, if the nominal streamer length is 10000 m and SPI=37.5 m, then SL=9900 m.

In operation, the acquisition of seismic data from a cell using the above-described vessel configuration can be achieved by performing consecutive passes of the vessel configuration over the cell with each pass being separated by a distance of SW/2 and with each source vessel shooting alternately with an inline distance defined by SPI. Additionally, as will be discussed in more detail below with respect to FIG. 8, according to an embodiment, alternative configurations can be used in each successive (opposite) pass to perform interleaved acquisition.

Figure 2:
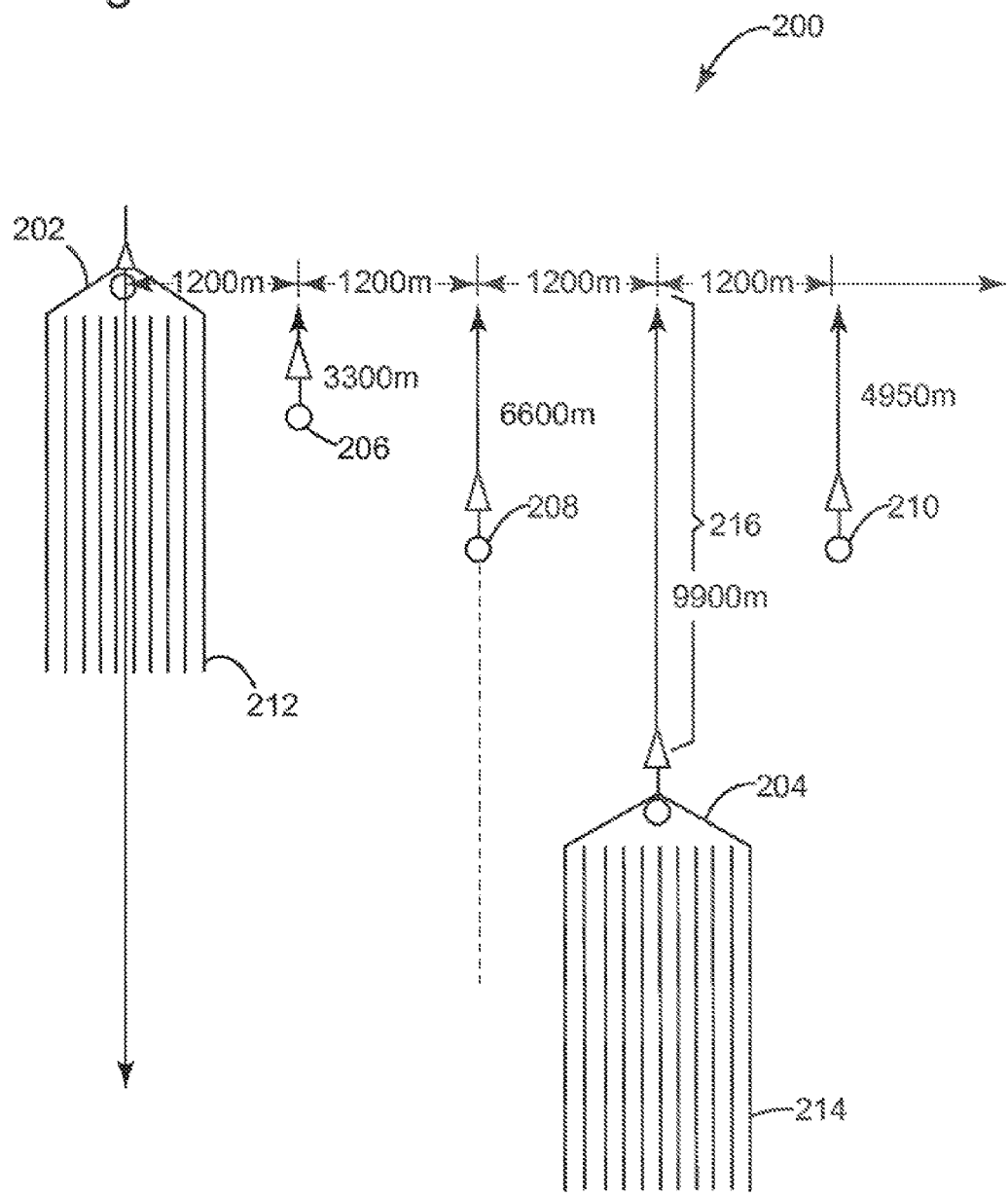
FIG. 2 is a schematic diagram of a novel seismic data acquisition system according to an exemplary embodiment wherein all source vessels are not located cross-line between streamer vessels.

To better understand how a streamer/source vessel configuration according to these embodiments can be established using the above-described locational relationships between the vessels, an exemplary embodiment of seismic towed vessels 200 is depicted in FIG. 2. In this purely illustrative example, the variable configuration values described above have been selected to be NS=10, SP=120, SW=1200, SPI=37.5 m, and SL=9900 m and, therefore applying the relationships described above, a first streamer vessel 202 is disposed at coordinates (0,0), a first source vessel 206 is disposed at coordinates (1200 m,−3300 m), a second source vessel 208 is disposed at (2400 m,−6600 m), a second streamer vessel 204 is disposed at coordinates (3600 m,−9900 m), and a third source vessel is disposed at coordinates (4800 m,−4950 m).

It should be noted in the exemplary embodiment that the seismic towed streamer vessels 202, 204 are configurable with respect to the number of streamers 212, 214 per vessel, the separation (offset) distance between the streamer vessel 702 and streamer vessel 704 and the length of the streamers 212, 214. Further, it should be noted in the exemplary embodiment that the streamer vessels 202, 204 are separated (offset) in the cross-line direction by one or more source vessels 206, 208 and the leading edge of the streamer vessels 202, 204 are offset in the in-line direction from each other by a predefined distance 216. Further, it should be noted in the exemplary embodiments that the streamer vessels can overlap in the in-line direction and the streamers associated with a given streamer vessel can have variable distances between the streamers.

As implied by the coordinates at which the vessels are placed and as shown in FIG. 2, the in-line and cross-line offsets of the vessels relative to one another can be described as follows. The streamer vessel 202 is adjacent to source vessel 206 wherein source vessel 206 is cross-line offset by one thousand two hundred meters from streamer vessel 202 and in-line offset by three thousand three hundred meters from the leading edge of streamer vessel 202. Source vessel 206 is adjacent to source vessel 208 wherein source vessel 208 is cross-line offset by two thousand four hundred meters from streamer vessel 202 and in-line offset by six thousand six hundred meters from the leading edge of streamer vessel 202. Source vessel 208 is adjacent to streamer vessel 204 wherein streamer vessel 204 is cross-line offset by three thousand six hundred meters from streamer vessel 202 and in-line offset by nine thousand nine hundred meters from the leading edge of streamer vessel 202. Streamer vessel 204 is adjacent to source vessel 210 wherein source vessel 210 is cross-line offset by four thousand eight hundred meters from streamer vessel 202 and in-line offset by four thousand nine hundred fifty meters from the leading edge of streamer vessel 202. It should be noted in the exemplary embodiment of FIG. 2 that each streamer vessel and source vessel can be attached to independent tow lines connected to a tow vessel. As mentioned earlier, the specific offset distances described above and shown in FIG. 2 are purely illustrative of one exemplary configuration and those skilled in the art will appreciate that other embodiments can use other offset distances.

Continuing with the exemplary embodiment, acquisition geometry is defined by making consecutive passes over the mapping area (cell) with each pass separated by a distance of one-half of the streamer width and each source vessel shooting alternatively with an inline distance defined shot point interval. It should be noted that each alternative can be performed in an opposite pass, i.e., interleave acquisition. It should further be noted that to achieve a wide azimuth distribution, the same setup can be repeated in one or more directions, i.e., multiple passes can be executed at an angle to the direction of the previous passes.

Looking now to FIG. 3, an exemplary embodiment of an antiparallel acquisition pattern 300 using the vessel configuration of FIG. 2 is depicted. The exemplary embodiment antiparallel acquisition pattern 300 comprises a first pass 302, a second pass 304, a third pass 306, a streamer vessel 308, a streamer vessel 310 and source vessels 312, 314, 316. It should be noted in the exemplary embodiment that other configurations can have a different number of streamer vessels and/or source vessels. Further, it should be noted in the exemplary embodiment that the first pass 302 and the third pass 306 travel in the same direction, a direction approximately one hundred eighty degrees rotated from the direction of travel of the second pass 304 and the distance between pass centerlines is approximately one half of the streamer vessel width (SW/2) on each pass.

Figure 4A:
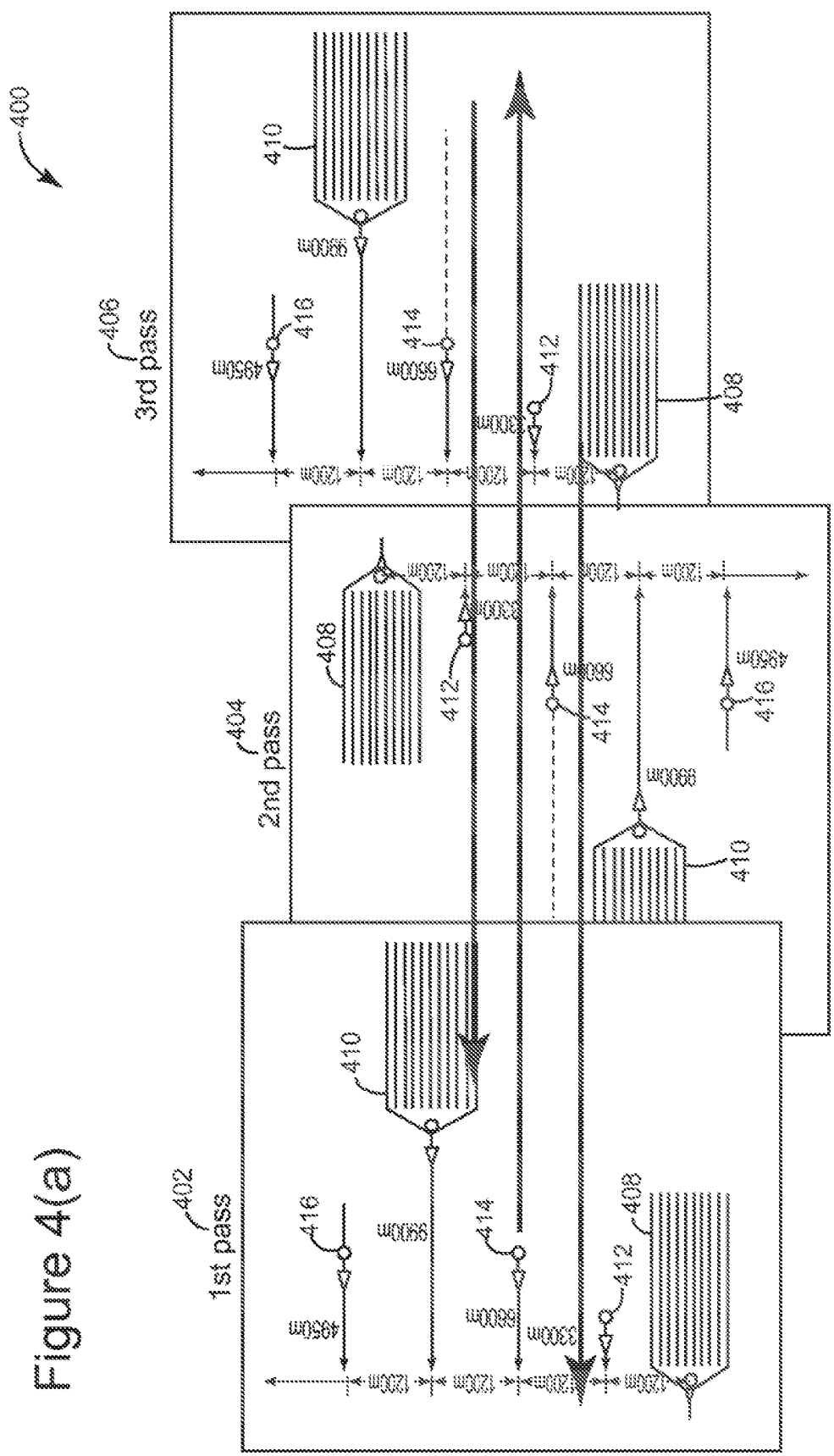
FIG. 4(a) is a schematic diagram of a novel seismic data acquisition system according to an exemplary embodiment wherein different passes in a cross-line direction are depicted.

Looking now to FIG. 4(a), another exemplary embodiment antiparallel acquisition pattern 400 is depicted. The exemplary embodiment antiparallel acquisition pattern 400 comprises a first pass 402, a second pass 404, a third pass 406, a streamer vessel 408, a streamer vessel 410 and source vessels 412, 414, 416. It should be noted in the exemplary embodiment that although the antiparallel acquisition pattern 400 resembles the antiparallel acquisition pattern 300, the antiparallel acquisition pattern 400 traverses a direction perpendicular to and crossing the path traveled by antiparallel acquisition pattern 300. Further, it should be noted in the exemplary embodiment that the first pass 402 and the third pass 406 travel in the same direction, a direction approximately one hundred eighty degrees rotated from the direction of travel of the second pass 404 and the distance between pass centerlines is approximately one half of the streamer vessel width (SW/2) on each pass.

Figure 4B:
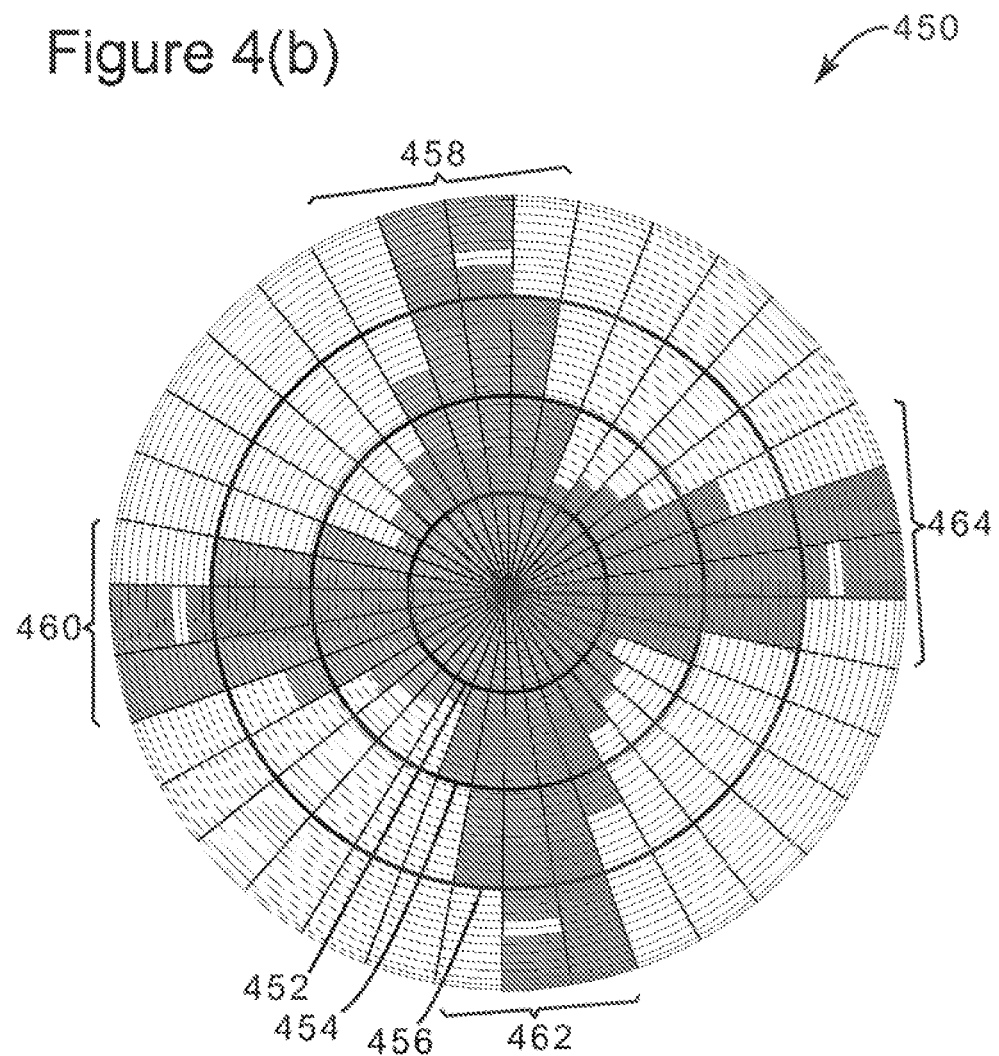
FIG. 4(b) is an exemplary embodiment of a rose diagram associated with a novel seismic data acquisition system.

Looking now to FIG. 4(b), another Rose diagram 450 of the data collected by the exemplary embodiment seismic data acquisition system 200 is depicted. The exemplary embodiment Rose diagram 450 illustrates a 5000 meter distance 452, a 10,000 meter distance 454 and a 15,000 meter distance 456 of a circular area. Continuing with the exemplary embodiment Rose diagram 450, four azimuthal bands 458, 460, 462, 464 of charted data are shown representing the two antiparallel towing directions of the seismic data acquisition system 200. Blank regions indicate areas where no data was collected as a result of the seismic data system 200 configuration, antiparallel tow patterns and the shot point interval. Accordingly, it can be seen from the Rose diagram 450 that coverage area of the seismic data is an improvement over the coverage area represented by Rose diagram 60 wherein the 5000 meter concentric ring 452 having complete coverage.

Figure 1C:
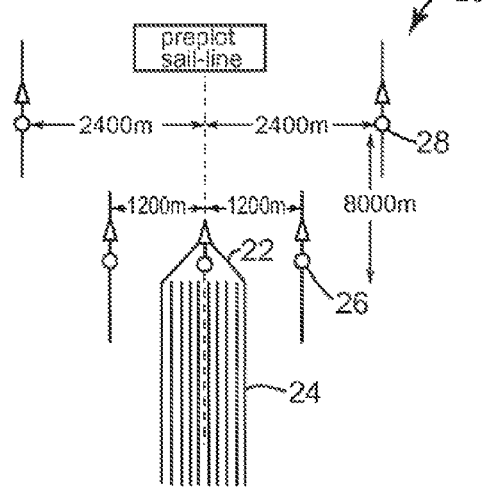
Figure 1D:
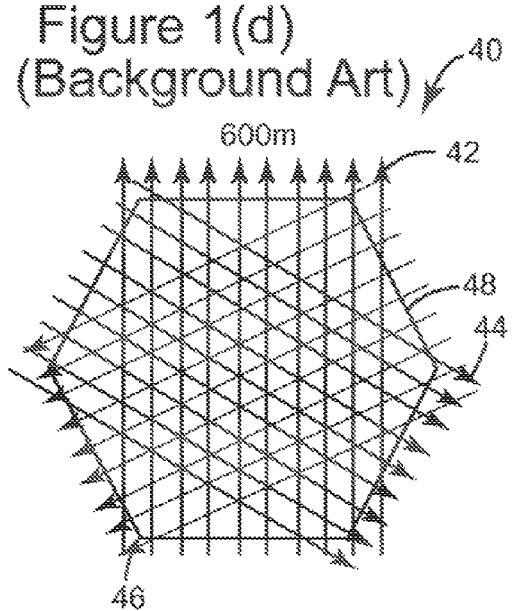

According to other embodiments, a different streamer vessel/source configuration than those described above with respect to FIGS. 1-2 can be used to perform marine seismic surveys. In the following embodiments, instead of a single streamer vessel as in the foregoing embodiments, two streamer vessels can be arranged in a staggered relationship relative to each other to provide a stretching of the vessel setup or configuration in both the inline and cross-line directions. More specifically, according to some embodiments, a five vessel setup or configuration can be specified by placing vessels at the following relative coordinates:

One streamer vessel is positioned at coordinate (0, 0),
One source vessel at approximately coordinate (SW; −SL/4),
One source vessel at approximately coordinate (SW*2; −2*SL/4),
One streamer vessel at approximately coordinate (SW*3; 3*SL/4), and
One source vessel at approximately coordinate (SW*4; −SL), where the coordinate variables are determined as follows:
NS=number of streamers per vessel, SP=separation between streamers.
SW=NS*SP,
SPI=Shot point interval, and
SL=streamer length adjusted so SL is a multiple of SPI and 2. For example, if the nominal streamer length is 10000 meters and SPI=37.5 meters, then SL=9900 meters.

In operation, the acquisition of seismic data from a cell using the above-described vessel configuration can be achieved by performing consecutive passes of the vessel configuration over the cell with each pass being separated by a distance of SW/2 and with each source vessel shooting alternately with an inline distance defined by SPI. Additionally, as will be discussed in more detail below with respect to FIG. 5, according to an embodiment, alternative configurations can be used in each successive (opposite) pass to perform interleaved acquisition.

Figure 5:
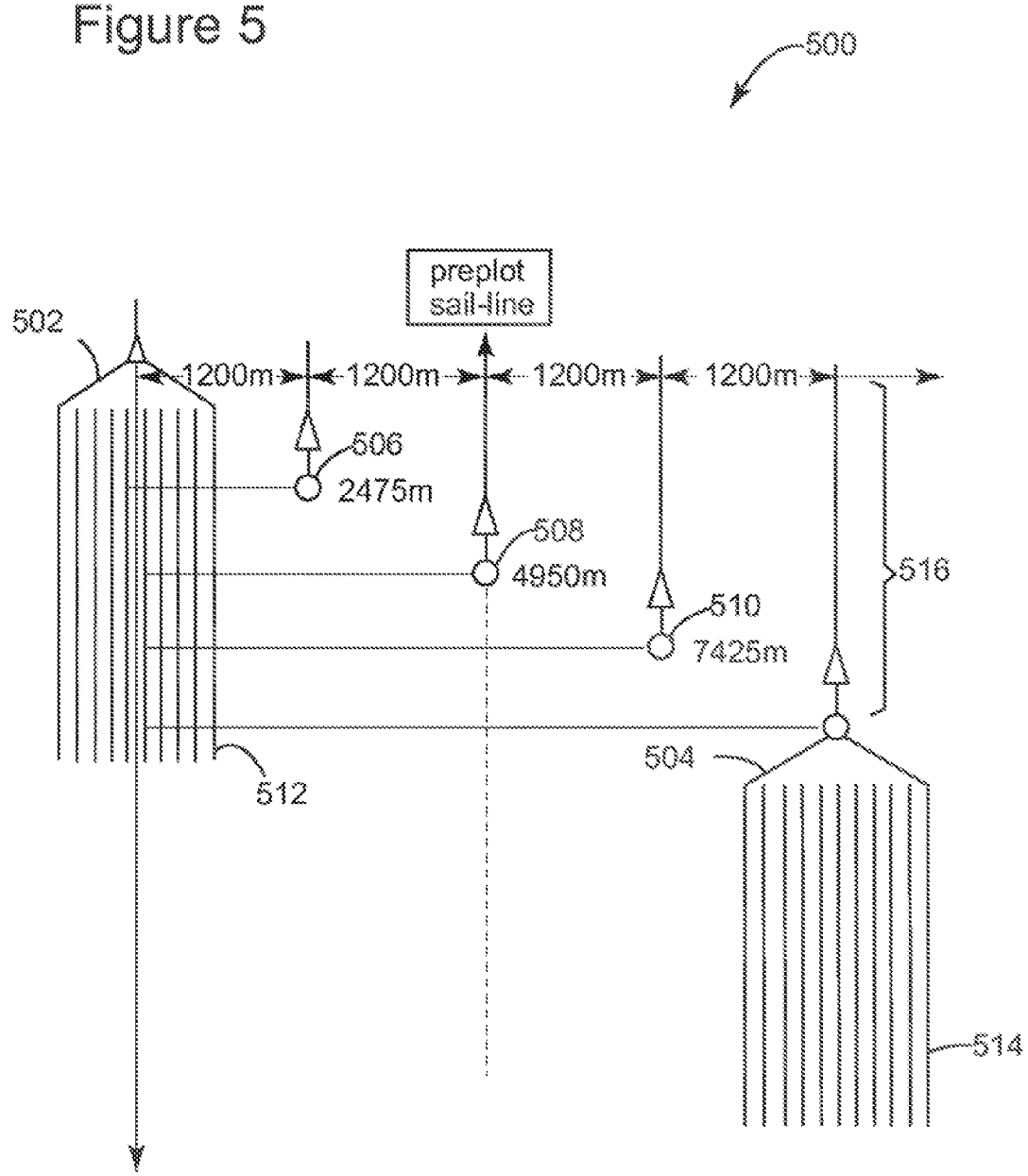
FIG. 5 is a schematic diagram of a seismic data acquisition system having plural source vessels located cross-line between streamer vessels according to an exemplary embodiment.

Looking now to FIG. 5, another exemplary embodiment of seismic towed vessels 500 is depicted having a different vessel configuration than those described above. The exemplary embodiment of FIG. 5 comprises two seismic towed streamer vessels 502, 504 and three seismic towed source vessels 506, 508, 510. It should be noted in the exemplary embodiment that the seismic towed streamer vessels 502, 504 are configurable with respect to the number of streamers 514, 516 per vessel, the separation distance between streamer vessel 502 and streamer vessel 504 and the length of the streamers 514, 516. Further, it should be noted in the exemplary embodiment that the streamer vessels 502, 504 are separated cross-line by one or more source vessels 506, 508, 510 and the leading edge of the streamer vessels 502, 504 are in-line offset from each other by a configurable distance 516. Further in the exemplary embodiment, the source vessels 506, 508, 510 are in-line offset from the streamer vessels 502, 504 and from each other by a configurable in-line distance.

For example, streamer vessel 502 is adjacent to source vessel 506 wherein source vessel 506 is cross-line offset twelve hundred meters from streamer vessel 502 and in-line offset two thousand four hundred seventy-five meters from the leading edge of streamer vessel 502, source vessel 506 is adjacent to source vessel 508 wherein source vessel 508 is cross-line offset two thousand four hundred meters from streamer vessel 502 and in-line offset four thousand nine hundred fifty meters from the leading edge of streamer vessel 502, source vessel 508 is adjacent to source vessel 510 wherein source vessel 510 is cross-line offset three thousand six hundred meters from streamer vessel 502 and in-line offset seven thousand four hundred twenty-five meters from the leading edge of streamer vessel 502 and source vessel 510 is adjacent to streamer vessel 504 wherein streamer vessel 504 is cross-line offset four thousand eight hundred meters from streamer vessel 502 and in-line offset nine thousand nine hundred meters from the leading edge of streamer vessel 502. It should be noted in the exemplary embodiment that each streamer vessel and source vessel can be attached to independent tow lines connected to a tow vessel.

Figure 6:
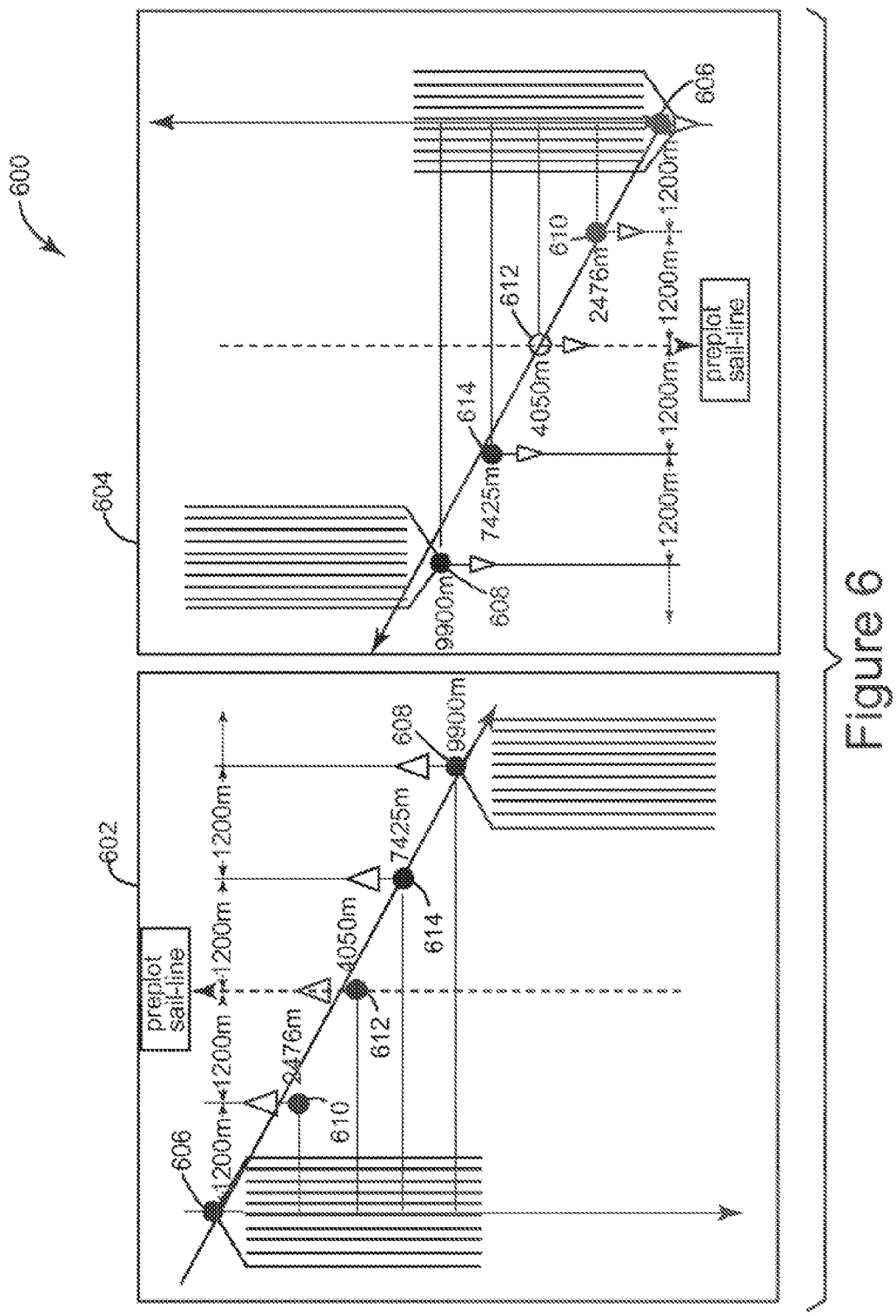
FIG. 6 is a schematic diagram of a seismic data acquisition system having plural source vessels wherein streamer vessels maintain relative position during adjacent passes.

Looking now to FIG. 6, an exemplary embodiment of an antiparallel acquisition pattern 600 is depicted. The exemplary embodiment antiparallel acquisition pattern 600 comprises a first pass 602, a second pass 604, a streamer vessel 606, a streamer vessel 608 and source vessels 610, 612, 614. It should be noted in the exemplary embodiment that other configurations can have a different number of streamer vessels and/or source vessels. Further, it should be noted in the exemplary embodiment that the first pass 602 and the second pass 604 travel in directions approximately one hundred eighty degrees rotated from each other and the distance between pass centerlines is approximately one half of the streamer vessel width (SW/2) on each pass. It should also be noted in the exemplary embodiment that additional passes can be made in conjunction with the size of the survey area.

Figure 7A:
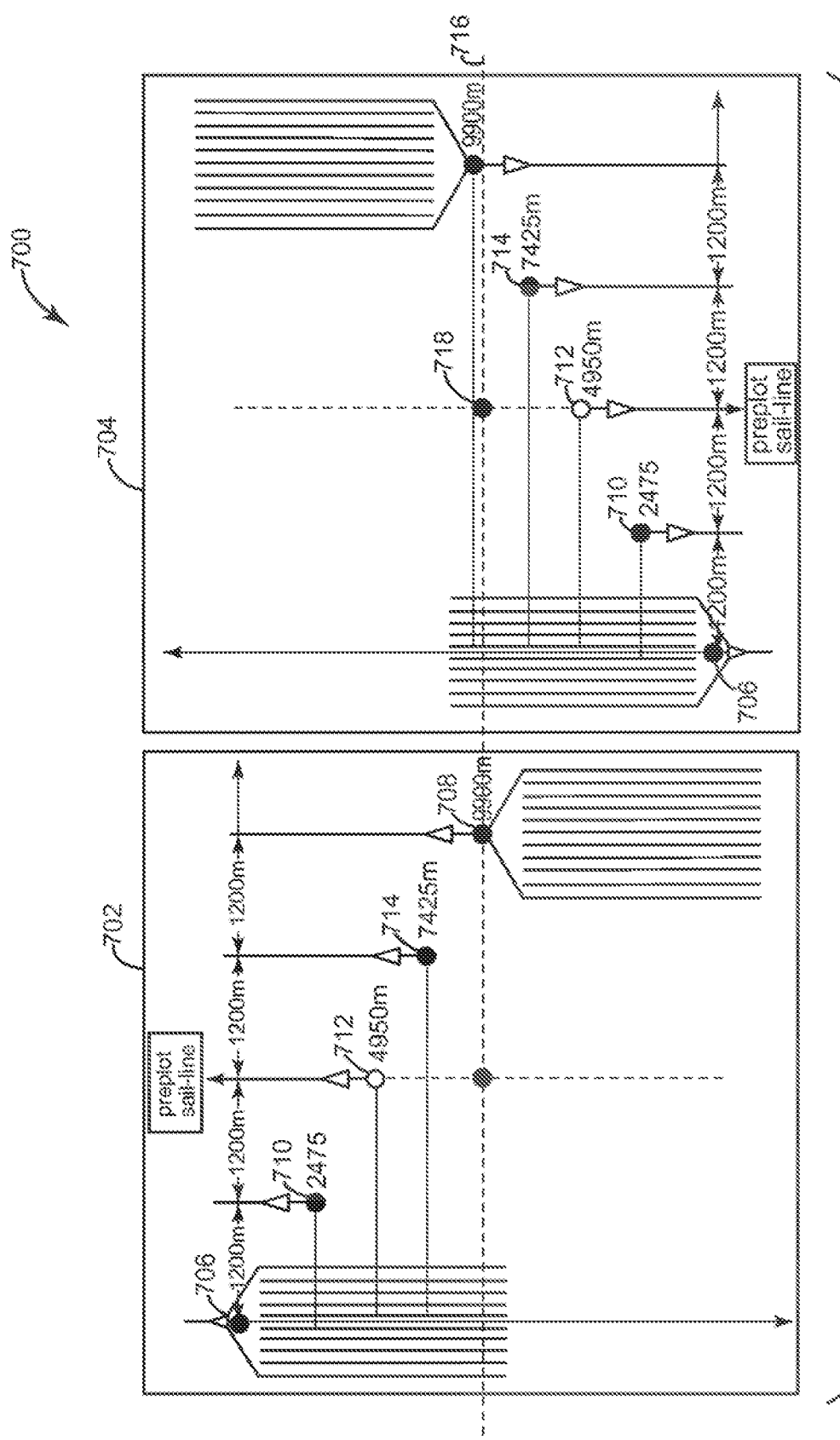
FIG. 7(a) is a schematic diagram of a seismic data acquisition system having plural source vessels wherein streamer vessels change relative position during adjacent passes.
Figure 7B:
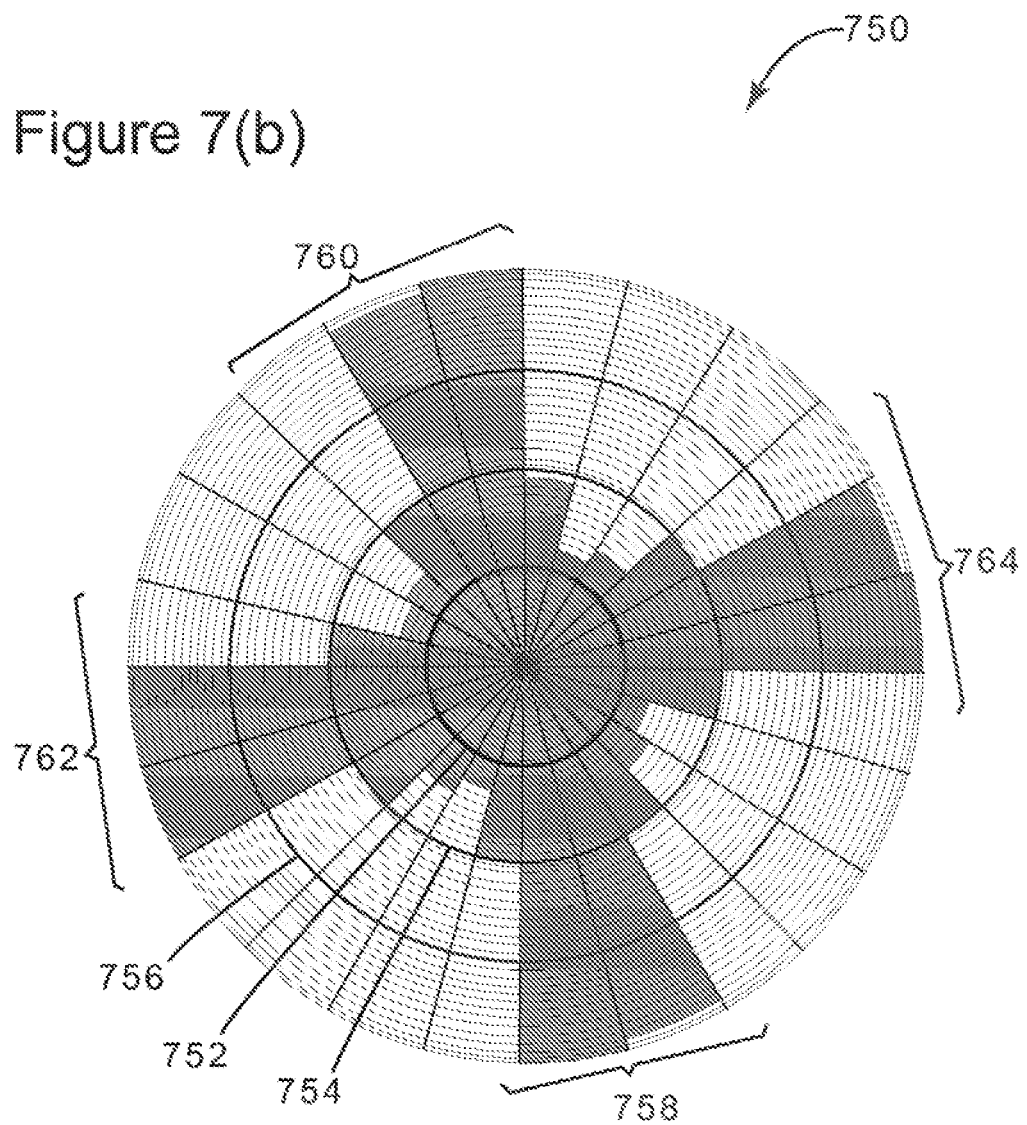
FIG. 7(b) is an exemplary embodiment of a rose diagram associated with a novel seismic data acquisition system wherein streamer vessels maintain relative position during adjacent passes.
Figure 7C:
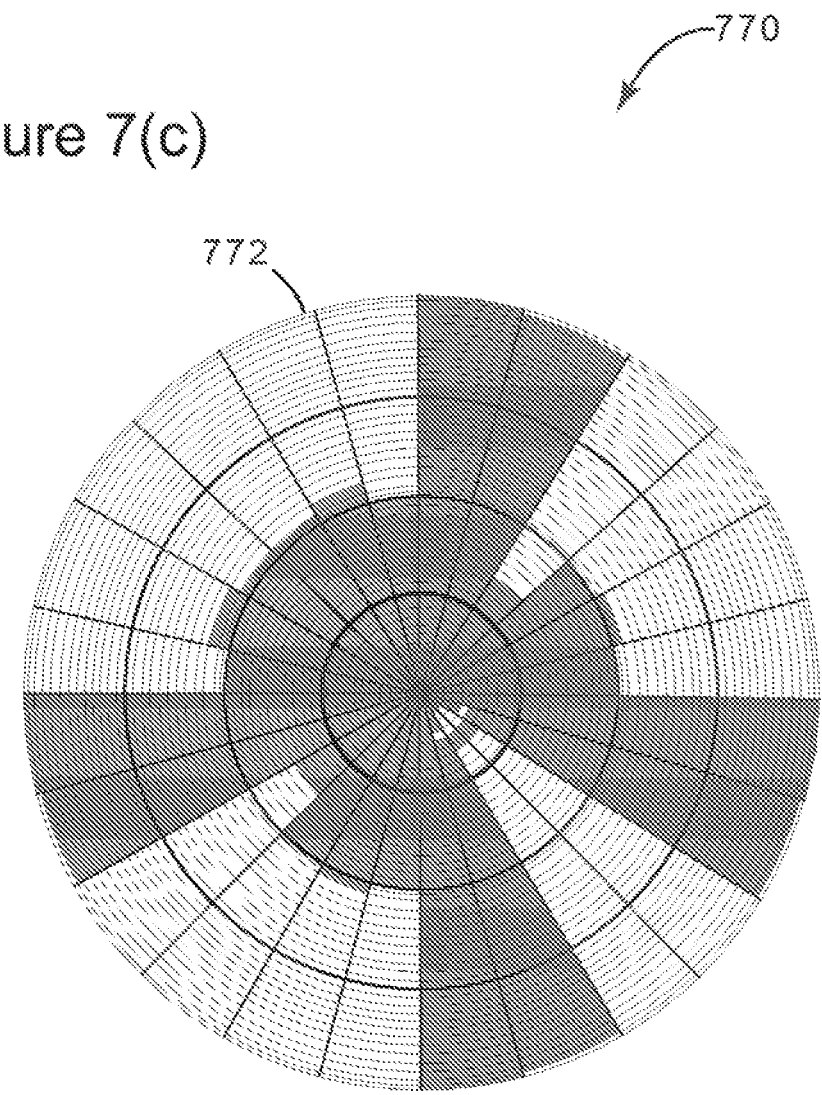
FIG. 7(c) is an exemplary embodiment of a rose diagram associated with a novel seismic data acquisition system wherein streamer vessels do not maintain relative position during adjacent passes.
Figure 7D:
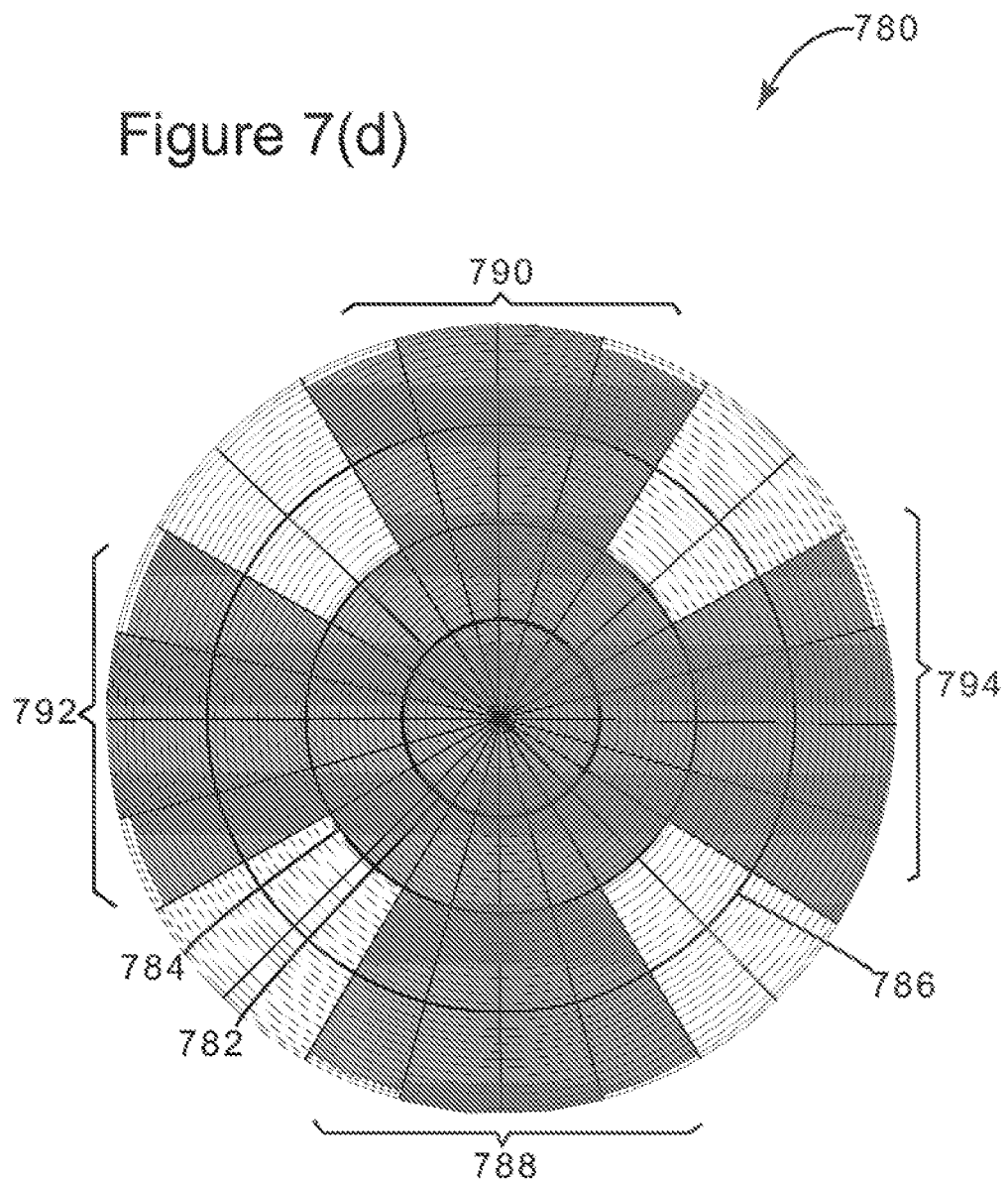
FIG. 7(d) is an exemplary embodiment of a rose diagram associated with a novel seismic data acquisition system wherein streamer vessels do not maintain relative position during adjacent passes and reciprocity of data is applied.

Looking now to FIG. 7(b), another Rose diagram 750 of the data collected by the exemplary embodiment seismic data acquisition system 600 is depicted. The exemplary embodiment Rose diagram 750 illustrates a 5000 meter distance 752, a 10,000 meter distance 754 and a 15,000 meter distance 756 of a circular area. Continuing with the exemplary embodiment Rose diagram 750, four azimuthal bands 758, 760, 762, 764 of charted data are shown representing the two antiparallel towing directions of the seismic data acquisition system 600. Blank regions of the exemplary embodiment Rose diagram 750 indicate areas where no data was collected as a result of the seismic data system 600 configuration, antiparallel tow patterns and the shot point interval. Accordingly, it can be seen from the exemplary embodiment Rose diagram 750 that coverage area of the seismic data is an improvement over the coverage area represented by exemplary embodiment Rose diagram 450 wherein the 5,000 meter concentric ring 752 having complete coverage and the 10,000 meter concentric ring having near complete coverage.

According to another embodiment depicted in FIG. 7(*a*), the same vessel setup or configuration 602 used above with respect to FIG. 6 can be used to perform seismic acquisition, however according to this embodiment the setup is inverted 604 for each adjacent line or pass during the acquisition. The purpose of this setup is to take advantage of the reciprocity principle. The rose diagram 772 of data acquired with setup on FIG. 7*a* is shown FIG. 7(*c*). The rose diagram 772 illustrates an asymmetric data distribution. In this context, reciprocity implies that the seismic trace from point S(a) to R(b) is equivalent to the seismic trace from S(b) to R(a), where a and b are the locations of the source and receiver, reciprocally. On a rose diagram (e.g., FIG. 7(*d*) discussed below), the reciprocal traces are disposed symmetrically with respect to the center. For embodiments which exploit this reciprocity principle, it is thus possible to provide more complete azimuth coverage in the rose diagram without doubling the fold.

An example of acquisition using reciprocity and vessel setup inversion according to an embodiment is provided as shown in FIG. 7(*a*). Therein, an exemplary embodiment antiparallel acquisition pattern 700 comprises a first pass 702, a second pass 704, a streamer vessel 706, a streamer vessel 708 and source vessels 710, 712, 714 configured between streamer vessel 706 and streamer vessel 708. It should be noted in the exemplary embodiment that other configurations can have a different number of streamer vessels and/or source vessels. Further, it should be noted in the exemplary embodiment that the first pass 702 and the second pass 704 travel in directions approximately one hundred eighty degrees rotated from each other and the distance between pass centerlines is approximately one half of the streamer vessel width (SW/2) on each pass. It should also be noted in the exemplary embodiment that additional passes can be made in conjunction with the size of the survey area. In another aspect of the exemplary embodiment, although alternating passes 702, 704 are in directions approximately one hundred eighty degrees rotated from each other, the vessels are inverted with respect to each other such that they are rotated one hundred eighty degrees around an axis 716 perpendicular to the direction of travel rather than rotated one hundred eighty degrees in the plane of the vessels around a point 718 in the plane of the vessels.

Looking now to FIG. 7(*c*), another Rose diagram 770 of the data collected by the exemplary embodiment seismic data acquisition system 500 using the antiparallel tow pattern 700 is depicted. The exemplary embodiment Rose diagram 7(*d*) is inverted for each adjacent line or pass during the acquisition to take advantage of the reciprocity principle. The exemplary embodiment Rose diagram 780, after reciprocity, illustrates a 5000 meter distance 782, a 10,000 meter distance 784 and a 15,000 meter distance 786 of a circular area. Continuing with the exemplary embodiment Rose diagram 780, four azimuthal bands 788, 790, 792, 794 of charted data are shown representing the two antiparallel towing directions of the seismic data acquisition system 500 and implementing the reciprocity principle. Blank regions of the exemplary embodiment Rose diagram 780 indicate areas where no data was collected as a result of the seismic data system 500 configuration, antiparallel tow patterns and the shot point interval. Accordingly, it can be seen from the exemplary embodiment Rose diagram 780 that coverage area of the seismic data is a significant improvement over the coverage area represented by exemplary embodiment Rose diagram 750 wherein the 5,000 meter concentric ring 782 having complete coverage and the 10,000 meter concentric ring 784 also having complete coverage.

Looking now to FIG. 8, an exemplary method embodiment 800 for seismic data acquisition is depicted. Beginning at step 802, the exemplary embodiment method configures a seismic data acquisition system by positioning a first streamer vessel a predetermined in-line distance and a predetermined cross-line distance from a second streamer vessel. It should be noted in the exemplary method embodiment the predetermined cross-line distance and the predetermined in-line distance can change between passes of the seismic data acquisition system over the sampled area.

Next, at step 804, the exemplary embodiment method further configures a seismic data acquisition system by positioning a plurality of source vessels with one or more predetermined cross-line distances and one or more predetermined in-line distances between each other, the first streamer vessel and the second streamer vessel. It should be noted in the exemplary method embodiment that the predetermined cross-line distances and the predetermined in-line distances can be different between pairs of vessels and between different passes of the seismic data acquisition system over the sampled area.

Next at step 806, the exemplary method embodiment continues by towing the seismic data acquisition system, for a first data acquisition, in one hundred eighty degree alternating passes across a mapping area until the mapping area has been covered. Continuing with the exemplary method embodiment, each pass of the seismic data acquisition system is separated by a predetermined pass distance and a shot is fired by one of the plurality of source vessels at a predetermined shot point interval. It should be noted in the exemplary method embodiment that the pass distance and the shot point interval can vary between passes and between shots respectively.

Next at step 808, the exemplary method embodiment continues by towing the seismic data acquisition system for a second data acquisition, intersecting the first data acquisition, in one hundred eighty degree alternating passes across the mapping are until the mapping area is covered. Continuing with the exemplary embodiment, each pass is separated by a predetermined pass distance and a shot is fired by one of said plurality of source vessels at a predetermined shot interval. It should be noted in the exemplary method embodiment that the pass distance and the shot point interval can vary between passes and between shots respectively.

Figure 9:
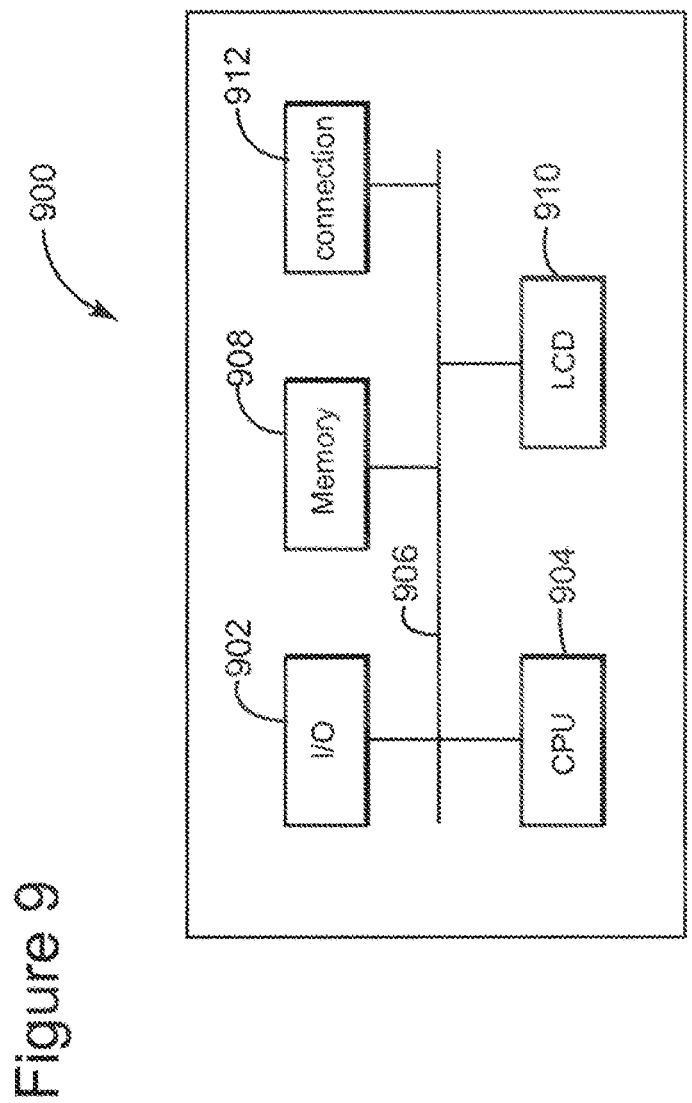
FIG. 9 is a schematic diagram of a computerized system that implements various methods according to an exemplary embodiment.

One or more of the methods discussed above may be implemented in a computerized navigation system which can be, for example, generally represented by the structure shown in FIG. 9. All the vessels involved in a seismic WAZ acquisition can be equipped with the same navigation system which uniquely identifies each source and receiver defined in the project (mapping). The navigation system from each vessel shares information/data with the navigation systems from the other vessels. This is generally achieved through the use of redundant radio links. One of the navigation systems is defined as the Master. The Master system monitors, e.g., in real time, the positions—inline (dDA) and crossline (DC) distances along a predefined track in the form of a bull eye—and the firing orders of the other vessels which are defined as Slaves. The firing sequence (which defines the pattern for which a source fires on which shot) is managed by the Master navigation system based on the preplot information. The navigation setup has the ability to change the mapping (fire pattern), suspend or add any Slave vessel at any time.

Thus, a computerized navigation system 900 may receive, via the input/output interface 902, information pertinent to positions of the sources and/or streamers, the arc angle, the turning radius, the run-in length, the run-out length, etc and may use this information to implement any of the configurations and/or seismic data acquisition methods described above In addition, the computerized system 900 may include a processor 904 for processing the above-noted data and for calculating, for example, the size of a cell. The interface 902 and the processor 904 are connected to a bus 906. Further, the computerized system 900 may include a memory 906 to store the above-noted data, a display 910, a connection 912 to the streamers and/or the sources, and other elements common for a computerized system or server as would be recognized by those skilled in the art. It will be appreciated by those skilled in the art that FIG. 9 represents a generalization of an onboard navigation system used in conjunction with the various embodiments described herein and that such a navigation system may omit elements illustrated in the figure and/or include other elements.

The above-disclosed exemplary embodiments provide a system and a method for improving azimuth distribution for seismic data acquisition. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Among other variations and permutations associated with the foregoing embodiments, consider that although the foregoing embodiments illustrate the streamers being parallel to one another, such is not required. For example, in yet another exemplary embodiment the streamers may be provided to have a dovetail-like (fan) arrangement. According to still another exemplary embodiment, the streamers may have a variable depth along as described, for example, in patent application Ser. No. 13/272,428, entitled "Method and Device to Acquire Marine Seismic Data," and authored by R. Soubaras, the entire content of which is incorporated herein by reference. In one application, the streamers are fanned in a horizontal plane (substantially parallel to the water surface) so that they make an angle with each other. To achieve this arrangement, birds may be located on each streamer for maintaining the streamers at the desired positions. The birds are devices capable of maintaining a vertical and/or horizontal position in the water.

Although the features and elements of the present exemplary embodiments are described in the embodiments in particular combinations, each feature or element can be used alone without the other features and elements of the embodiments or in various combinations with or without other features and elements disclosed herein. Further, it is noted that the above embodiments may be implemented in software, hardware or a combination thereof.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A survey acquisition system comprising:
    a plurality of streamers towed by a plurality of streamer vessels, including a first streamer vessel and a second streamer vessel;
    a plurality of sources towed by a plurality of source vessels,
    wherein said plurality of streamer vessels and said plurality of source vessels are configured relative to one another such that said plurality of source vessels are positioned at one or more predetermined inline distances behind a portion of the first streamer vessel and are also positioned at one or more predetermined inline distances in front of a portion of the second streamer vessel,
    wherein said plurality of streamer vessels and said plurality of source vessels are also spaced apart from one another in a cross-line direction, and
    wherein the one or more predetermined inline distances are greater than a shot point interval.

2. The system of claim 1, wherein said plurality of source vessels are each positioned at a different predetermined inline distance behind said portion of said first streamer vessel and at a different predetermined inline distance in front of said portion of said second streamer vessel.

3. The system of claim 1, wherein cross-line distances between adjacent streamer vessels and source vessels are the same.

4. The system of claim 1, wherein said plurality of source vessels are located in a cross-line direction between said first streamer vessel and said second streamer vessel.

5. The system of claim 1, wherein said one or more predetermined inline distances are multiples of the shot point interval.

6. The system of claim 1, wherein the shot point interval is an interval between two consecutive shots of a source vessel.

7. The system of claim 1, wherein the first streamer vessel is positioned at (0,0), a first source vessel is positioned at (SW;−SL/3), a second source vessel is positioned at (SW*2;−2*SL/3), the second streamer vessel is positioned at (SW*3;−SL), and a third source vessel is positioned at (SW*4;−SL/2),
    where:
    coordinates are expressed as relative (inline, cross-line) values,
    SW=(a number of streamers per streamer vessel)*(a separation between streamers)
    SL=an adjusted streamer length.

8. The system of claim 7, wherein the adjusted length of the plurality of streamers is adjusted to be a multiple of 2, 3 and the shot point interval.

9. The system of claim 1, wherein the first streamer vessel is positioned at (0,0), a first source vessel is positioned at (SW;−SL/4), a second source vessel is positioned at (SW*2;−2*SL/4), a third source vessel is positioned at (SW*3;3*SL/4), and the second streamer vessel is positioned at (SW*4;−SL), and where:
    coordinates are expressed as relative (inline, cross-line) values,
    SW=(a number of streamers per streamer vessel)*(a separation between streamers)
    SL=an adjusted streamer length.

10. The system of claim 9, wherein the adjusted length of the plurality of streamers is adjusted to be a multiple of 2 and the shot point interval.

11. The system of claim 1, wherein the one or more predetermined inline distances are calculated based on an adjusted length of the streamers.

12. A method for seismic data acquisition, said method comprising:
configuring a seismic data acquisition system by:
positioning a plurality of source vessels at one or more predetermined inline distances behind a portion of a first streamer vessel,
positioning the plurality of source vessels at one or more predetermined inline distances in front of a portion of a second streamer vessel,
spacing said plurality of streamer vessels and said plurality of source vessels apart from one another in a cross-line direction; and
acquiring the seismic data using the configured seismic data acquisition system by shooting sources associated with the plurality of source vessels to generate acoustic signals and receiving reflected acoustic signals at streamers associated with said first streamer vessel and said second streamer vessel,
wherein the one or more predetermined inline distances are greater than a shot point interval.

13. The method of claim 12, wherein said plurality of source vessels are each positioned at a different predetermined inline distance behind said portion of said first streamer vessel and at a different predetermined inline distance in front of said portion of said second streamer vessel.

14. The method of claim 12, wherein cross-line distances between adjacent streamer vessels and source vessels are the same.

15. The method of claim 12, wherein the first streamer vessel is positioned at (0,0), a first source vessel is positioned at (SW;−SL/3), a second source vessel is positioned at (SW*2;−2*SL/3), the second streamer vessel is positioned at (SW*3;−SL), and a third source vessel is positioned at (SW*4;−SL/2), where:
coordinates are expressed as relative (inline, cross-line) values,
SW=(a number of streamers per streamer vessel)*(a separation between streamers)
SL=an adjusted streamer length.

16. The method of claim 15, wherein the adjusted length of the plurality of streamers is adjusted to be a multiple of 2, 3 and the shot point interval.

17. The method of claim 12, wherein the first streamer vessel is positioned at (0,0), a first source vessel is positioned at (SW;−SL/4), a second source vessel is positioned at (SW*2;−2*SL/4), a third source vessel is positioned at (SW*3;3*SL/4), and the second streamer vessel is positioned at (SW*4;−SL), and where:
coordinates are expressed as relative (inline, cross-line) values,
SW=(a number of streamers per streamer vessel)*(a separation between streamers)
SL=an adjusted streamer length.

18. The method of claim 17, wherein the adjusted length of the plurality of streamers is adjusted to be a multiple of 2 and the shot point interval.

19. The method of claim 12, wherein said shot point interval is different for each of said plurality of source vessels.

20. A navigation system comprising:
a processor configured to transmit signals which facilitate positioning a plurality of source vessels at one or more predetermined inline distances behind a portion of a first streamer vessel, positioning the plurality of source vessels at one or more predetermined inline distances in front of a portion of a second streamer vessel, and spacing said plurality of streamer vessels and said plurality of source vessels apart from one another in a cross-line direction,
wherein the one or more predetermined inline distances are greater than a shot point interval.

* * * * *